(12) United States Patent
Ito

(10) Patent No.: US 7,424,411 B2  
(45) Date of Patent: Sep. 9, 2008

(54) ION IMPLANTATION SIMULATION APPARATUS, METHOD, AND PROGRAM

(75) Inventor: Sanae Ito, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 656 days.

(21) Appl. No.: 11/030,982

(22) Filed: Jan. 10, 2005

(65) Prior Publication Data

US 2005/0203721 A1    Sep. 15, 2005

(30) Foreign Application Priority Data

Jan. 9, 2004 (JP) .............................. 2004-004708

(51) Int. Cl.
*G06F 17/10* (2006.01)
(52) U.S. Cl. .............................. 703/2; 703/13; 700/123
(58) Field of Classification Search ................... 703/2, 703/6, 13; 700/119, 121, 123
See application file for complete search history.

(56) References Cited

U.S. PATENT DOCUMENTS 5,379,225 A * 1/1995 Tazawa et al. ................. 700/98

7,142,297 B2 * 11/2006 Zechner ....................... 356/335
7,162,400 B2 * 1/2007 Ito et al. ........................ 703/13
2002/0087298 A1     7/2002 Ito et al.

FOREIGN PATENT DOCUMENTS

| JP | 6-84823    | 3/1994  |
| JP | 6-290240   | 10/1994 |
| JP | 8-330376   | 12/1996 |
| JP | 11-111633  | 4/1999  |
| JP | 2002-203757| 7/2002  |

* cited by examiner

*Primary Examiner*—Russell Frejd
(74) *Attorney, Agent, or Firm*—Oblon, Spivak, McClelland, Maier & Neustadt, P.C.

(57) ABSTRACT

The group creation part divides n ion particles into groups of a group $G_1$, a group G2, . . . , and a group $G_k$. The individual area setting part sets an initial condition calculation area 1a, as an individual area of the group $G_1$, and makes the calculation part calculate movement of the ion particle. Then, one by one, the individual area setting part sets an individual area of a group $G_{i+1}$, based on a range Rp, a dispersion σL, etc. indicating a calculation result of an ion particle belonging to the group $G_i$. Further, the individual area setting part implants an ion particle belonging to the group $G_{i+1}$ into the individual area of the group $G_{i+1}$ and makes the calculation part calculate movement of the implanted ion particle.

11 Claims, 10 Drawing Sheets

ION IMPLANTATION SIMULATION APPARATUS, METHOD, AND PROGRAM

BACKGROUND OF THE INVENTION

1. Field of the Invention

The present invention relates to a simulation apparatus of a semiconductor device. For example, it relates to an ion implantation simulation apparatus and an ion implantation simulation method especially using the Monte Carlo method.

2. Description of the Related Art

According to the semiconductor TCAD (Technology Computer Aided Design) simulation apparatus which simulates manufacturing processes and electrical characteristics of a semiconductor device, characteristics of a semiconductor are estimated by suitably setting a limited calculation area, by solving an equation based on a physical model with setting up boundary conditions in the calculation area, and by obtaining a structure, an impurities distribution, a carrier distribution, a potential distribution, etc. in the calculation area.

In process simulators for simulating manufacturing processes of the semiconductor device, the Monte Carlo method is sometimes used for simulation of an ion implantation process. In the case of applying the Monte Carlo method to the simulation of an ion implantation process, a prescribed number of particles are implanted into a calculation area at the energy and angle under the implantation conditions, with weighting of ion according to the amount of dose under the implantation conditions. Then, the particles of the prescribed number are tracked until they become in the state of stopping caused by energy loss depending upon interaction with atoms of various substances in the calculation area. Based on a calculation result of the particles of the prescribed number, an impurities concentration distribution, a defect concentration distribution, etc. after the implantation are calculated, and it goes to calculation for a next process.

With respect to ion implantation process simulation, it can be roughly divided into the Monte Carlo method mentioned above and the distribution function method which approximates an ion distribution by an analytic function. Generally, the accuracy of the Monte Carlo method is higher compared to the distribution function method. However, there are a plenty of requests for further accuracy enhancement of the Monte Carlo method. Concerning this point, the technology of accurately simulating concentration distribution at a deep position by performing scattering tests using the Monte Carlo method with gradually changing the weight of the concentration is disclosed, for example, in Japanese Unexamined Patent Publication No. 6-84823.

In the Monte Carlo method, an initial position of an implanted particle is usually set at the spatially highest place in the calculation area randomly, by using uniform random numbers. However, when the condition of implantation is slanting (in the case of slanting implantation), if the initial position is not larger than the calculation area, there will be a portion where no implanted ion reaches on the material surface. Moreover, even under the condition of perpendicular implantation, namely not slanting, particles spilt outside the calculation area because of scattering are not tracked at the end of the calculation area. Thus, the concentration at the end of the calculation may decrease.

For this reason, in the ion implantation simulation using the Monte Carlo method, "reflection type boundary conditions", indicating when a particle reaches the boundary of the calculation area, the particle rebounds with saving the energy, is sometimes set up as boundary conditions. Moreover, "cycle type boundary conditions", indicating when a particle reaches the boundary of the calculation area, the particle performs re-incidence from the end of the opposite side of the calculation area with saving momentum to continue the calculation, is also sometimes set up.

However, the "reflection type boundary conditions" may not be appropriate in many cases since the movement direction of the implanted ion is reversed. Further, in the "cycle type boundary conditions", depending on how to set a calculation area, the calculation area may be incompatible with a device structure being a practical calculation object in many cases.

In such a case, the technology of "extension type boundary conditions" can be introduced as below. That is, different from the above-stated "reflection type boundary conditions" and the "cycle type boundary conditions", an end structure of the calculation area is extended towards outside the calculation area in order to remove the part where no implanted ion reaches from the original calculation area according to the "extension type boundary conditions". Moreover, in the technology of the "extension type boundary conditions", particles spilt outside the original calculation area because of scattering and particles entered from the area extended outside the original calculation area are balanced in order not to cause an unusual concentration fall at the calculation area edge.

When using the technology of this "extension type boundary condition", it is necessary to suitably determine the size to extend. If the extension width is too large, it takes a long time to calculate a concentration distribution with required accuracy. On the other hand, if the extension width is too small, the concentration distribution at the calculation area edge will become inaccurate. Since required extension sizes are various depending upon implantation conditions, it can be acceptable, for example, to prepare a parameter beforehand and to calculate an extended area based on an ion type, energy, a dose amount, an implantation angle, and a target material, for implantation conditions of a certain range.

However, in the ion implantation calculation using the Monte Carlo method, since these conditions concerning the implantation are very diverse, making a parameter table to determine an extended area beforehand has a scope limit to apply.

As another method, there is a method of actually performing an implantation calculation to obtain an extension width. In this method, a part of total n particles used for the Monte Carlo calculation are utilized for calculating an extension width. Usually, as to the total n particles, about $10^4$ or more particles are used in the implantation calculation even for the one dimensional structure. Therefore, n0 particles at a beginning part of the total particles used for the calculation, for example about one hundred (about 1%) particles, are implanted without taking an extended area into consideration, and a tracking calculation is performed until they become in the state of stopping. Then, statistics amount of "range Rp in the incident direction (called just a range Rp, hereafter)", "standard deviation $\sigma L$ of a resting position perpendicular to the incident direction (called just a standard deviation $\sigma L$, hereafter), etc. obtained from the calculation result of these n0 particles is calculated. It is assumed that these values are close to the result of implantation calculation using all n particles, an extended area which can cover ions implanted into an analysis area by slanting ion implantation without a gap is calculated and the extended area is defined to keep the amount of particles spilt out/in by scattering at the analysis area end to be almost balanced.

However, in this conventional technology, for example under the implantation conditions of high dose, it is impossible to accurately simulate the phenomenon that the Si (silicone) substrate becomes amorphous and channeling changes because of ions during the implantation. That is, when the statistics amount of the range Rp, the standard deviation σL, etc. obtained by using the n0 particles at the starting is different from that obtained from the calculation result of the implantation calculation using all the n particles, the set-up extended area is not suitable. Consequently, faults may arise that the rate of particles stopping still in the original calculation area becomes decreasing because the extended area is too large beyond necessity, or a distribution in which particles are spilt outside the calculation area end because the extended area is not extended enough to be a required size is obtained. Thus, for example under the implantation conditions of high dose, in the case a crystal structure of Si substrate turns to have an amorphous phenomenon and an amount of statistics calculated by some particles at the starting becomes different from what is obtained from a calculation result using all the n particles because of ions during the implantation, there is a problem that the accuracy of the calculation result is ruined as the set-up extended area is not suitable.

[Patent Document 1] Japanese Unexamined Patent Publication No. 6-84823 is a related art of the present invention.

SUMMARY OF THE INVENTION

It is one of objects of the present invention to provide a high-accuracy ion implantation simulation apparatus and a high-accuracy ion implantation simulation method taking it into consideration that a crystal structure of Si substrate becomes amorphous under the implantation conditions of high dose, etc.

These and other objects of the embodiments of the present invention are accomplished by the present invention as hereinafter described in further detail.

According to one aspect of the present invention, an ion implantation simulation apparatus for simulating movement of an ion particle to which a particle number is given, includes:

a group creation part to divide n ion particles ($n \geq 3$) into groups of at least three, according to the particle number;

an individual area setting part to individually set up a calculation area, as an individual area, indicating an area for calculating movement of one of the n ion particles, for each of the groups divided by the group creation part, and to implant the one of the n ion particles into the individual area individually set up, for performing simulation; and a calculation part to calculate the movement of the one of the n ion particles implanted by the individual area setting part in order to simulate movement of the one of the n ion particles.

According to another aspect of the present invention, the ion implantation simulation apparatus further includes:

a storage part to store a calculation area defined based on an initial condition, as an initial condition calculation area, wherein the group creation part divides the n ion particles into k ($k \geq 3$) groups of a group $G_1$, a group $G_2$, . . . , and a group $G_k$ in order of the particle number, and the individual area setting part sets the initial condition calculation area stored by the storage part, as an individual area of the group $G_1$, implants an ion particle belonging to the group $G_1$ into the individual area of the group $G_1$, and makes the calculation part calculate movement of the implanted ion particle, based on a calculation result of the movement of the implanted ion particle belonging to the group $G_1$, sets an individual area of the group $G_2$, implants an ion particle belonging to the group $G_2$ into the individual area of the group $G_2$, and makes the calculation part calculate movement of the implanted ion particle, and one by one, based on a calculation result of movement of an ion particle belonging to a group $G_i$ ($2 \leq i \leq k-1$), sets an individual area of a group $G_{i+1}$, implants an ion particle belonging to the group $G_{i+1}$ into the individual area of the group $G_{i+1}$ and makes the calculation part calculate movement of the implanted ion particle.

According to another aspect of the present invention of the ion implantation simulation apparatus, the individual area setting part, in the case of setting an individual area of a group $G_j$ ($2 \leq j \leq k$), sets the individual area by using an implantation angle of an ion particle, a range in an incident direction of the ion particle, and a standard deviation of a stopping position perpendicular to the incident direction of the ion particle which are concerning implantation of the ion particle belonging to a group $G_{j-1}$ into an individual area of the group $G_{j-1}$.

According to another aspect of the present invention of the ion implantation simulation apparatus, the individual area setting part, in the case of setting an individual area of a group $G_j$ ($2 \leq j \leq k$), based on a calculation result of movement of an ion particle belonging to a group $G_{j-1}$, judges whether to set an individual area of the group $G_{j-1}$ as the individual area of the group $G_j$, if it is judged to set, sets the individual area of the group $G_{j-1}$ as the individual area of the group $G_j$, and if it is judged not to set, sets an individual area different from the individual area of the group $G_{j-1}$, as the individual area of the group $G_j$.

According to another aspect of the present invention of the ion implantation simulation apparatus, the group creation part determines the number of groups to be divided, based on n indicating the number of ion particles.

According to one aspect of the present invention, an ion implantation simulation method for simulating movement of an ion particle to which a particle number is given, includes:

dividing n ion particles ($n \geq 3$) into groups of at least three, according to the particle number;

individually setting up a calculation area, as an individual area, indicating an area for calculating movement of one of the n ion particles, for each of the divided groups, and implanting the one of the n ion particles into the individual area individually set up, for performing simulation; and calculating the movement of implanted one of the n ion particles in order to simulate movement of the one of the n ion particles.

According to one aspect of the present invention, an ion implantation simulation program for simulating movement of an ion particle to which a particle number is given, includes:

a processing of dividing n ion particles ($n \geq 3$) into groups of at least three, according to the particle number;

a processing of individually setting up a calculation area, as an individual area, indicating an area for calculating movement of one of the n ion particles, for each of the divided groups, and implanting the one of the n ion particles into the individual area individually set up, for performing simulation; and a processing of calculating the movement of implanted one of the n ion particles in order to simulate movement of the one of the n ion particles.

Further scope of applicability of the present invention will become apparent form the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
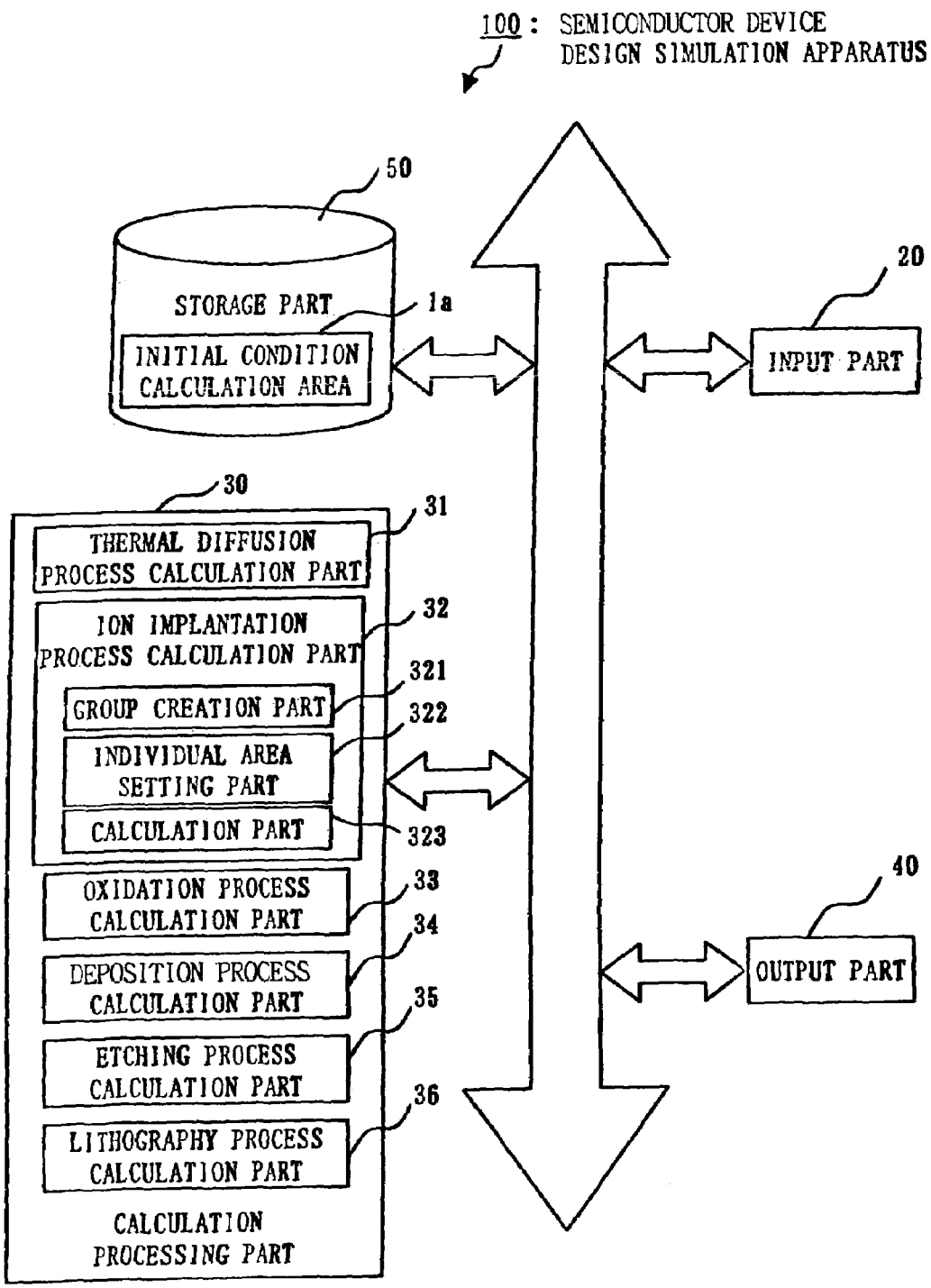
FIG. 1 shows a structure of a semiconductor device design simulation apparatus 100 according to Embodiment 1.

Reference will now be made in detail to the present preferred embodiments of the invention, examples of which are illustrated in the accompanying drawings, wherein like reference numerals indicate like devices through out the several views.

Embodiment 1

With reference to FIGS. 1 to 9, a semiconductor device design simulation apparatus 100 of Embodiment 1 will be explained. According to Embodiment 1, when the semiconductor device design simulation apparatus 100 calculates movement of an ion particle by using the Monte Carlo method, a setting range of an initial position of an ion particle used for calculation and a range of an area for tracking the ion particle are dynamically changed during the calculation, and they are applied to ion particles for performing subsequent calculations. That is, in the present Embodiment, the area (called a calculation area, henceforth) for calculating movement of an ion particle, which includes the setting range of the initial position of the ion particle used for calculation and the range of the area for tracking the ion particle, is dynamically changed while calculating to perform subsequent calculations.

First, the structure of the semiconductor device design simulation apparatus 100 will be described.

FIG. 1 is a block diagram showing a functional structure of the semiconductor device design simulation apparatus 100 according to Embodiment 1.

The semiconductor device design simulation apparatus 100 is composed of an input part 20 for receiving an input of data, command, etc. from an operator, a calculation processing part 30, as functional means for simulating each process of a semiconductor process, an output part 40 for outputting a calculation result, and a storage part 50 for storing input data etc. The calculation processing part 30 includes calculation parts, such as a thermal diffusion process calculation part 31, an ion implantation process calculation part 32, an oxidization process calculation part 33, a deposition process calculation part 34, an etching process calculation part 35, and a lithography process calculation part 36.

The ion implantation process calculation part 32, described in detail later, includes a group creation part 321 for dividing ion particles being objects of simulation, into some groups, an individual area setting part 322 which individually sets a calculation area indicating an area for calculating an ion particle, in each group divided by the group creation part 321 (the calculation area being set individually will be called an individual area hereinafter), and a calculation part 323 for calculating movement of an ion particle in the individual area set up by the individual area setting part 322.

The input part 20 is composed of, for example, a keyboard a mouse, a flexible disk device, (not shown), etc. The calculation processing part 30 and the storage part 50 are composed of a computer system including a CPU (Central Processing Unit) not shown and storage devices, such as a ROM (Read Only Memory), a RAM (Random Access Memory), and a magnetic disk drive, which are connected to the CPU and not shown. The output part 40 is composed of a display unit, a printer, etc. which are not illustrated.

In process simulations for evaluating manufacturing processes of a semiconductor device, the present Embodiment 1 relates to an ion implantation simulation which carries out simulation of an ion implantation process by using the Monte Carlo method.

Figure 2:
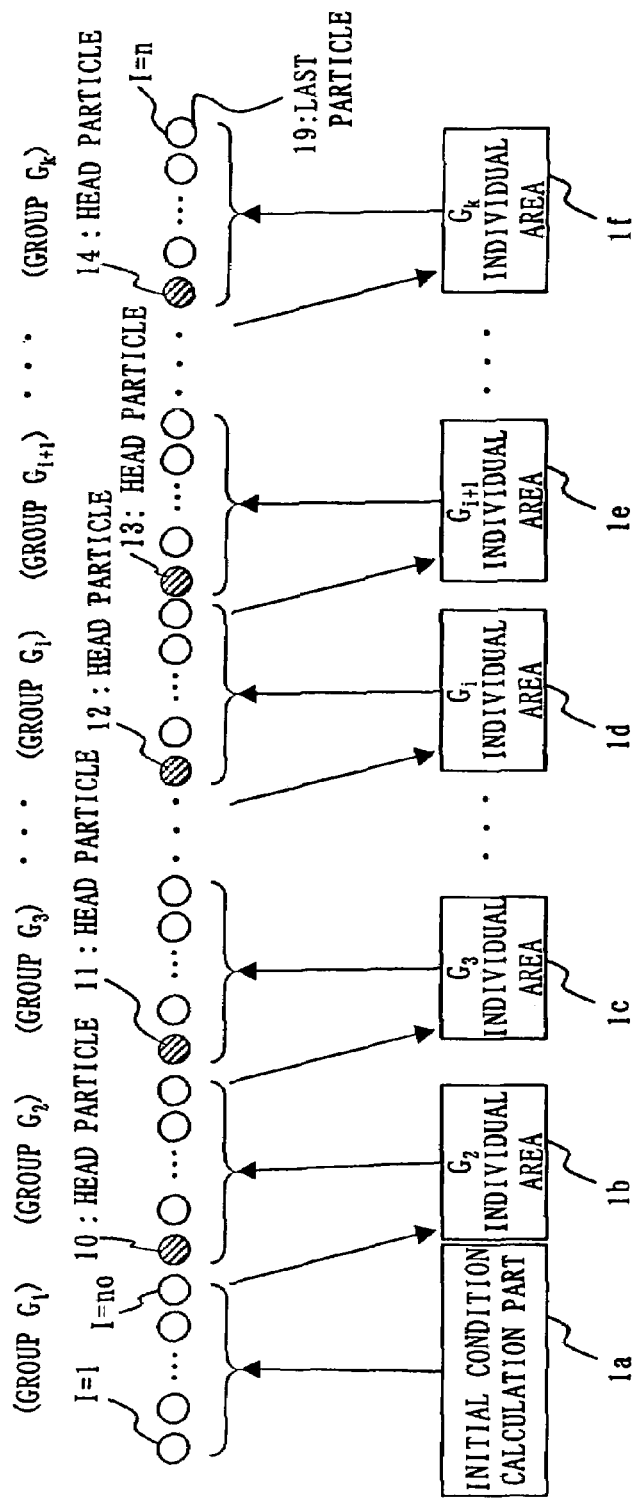
FIG. 2 illustrates a setup of an individual area.
Figure 3:
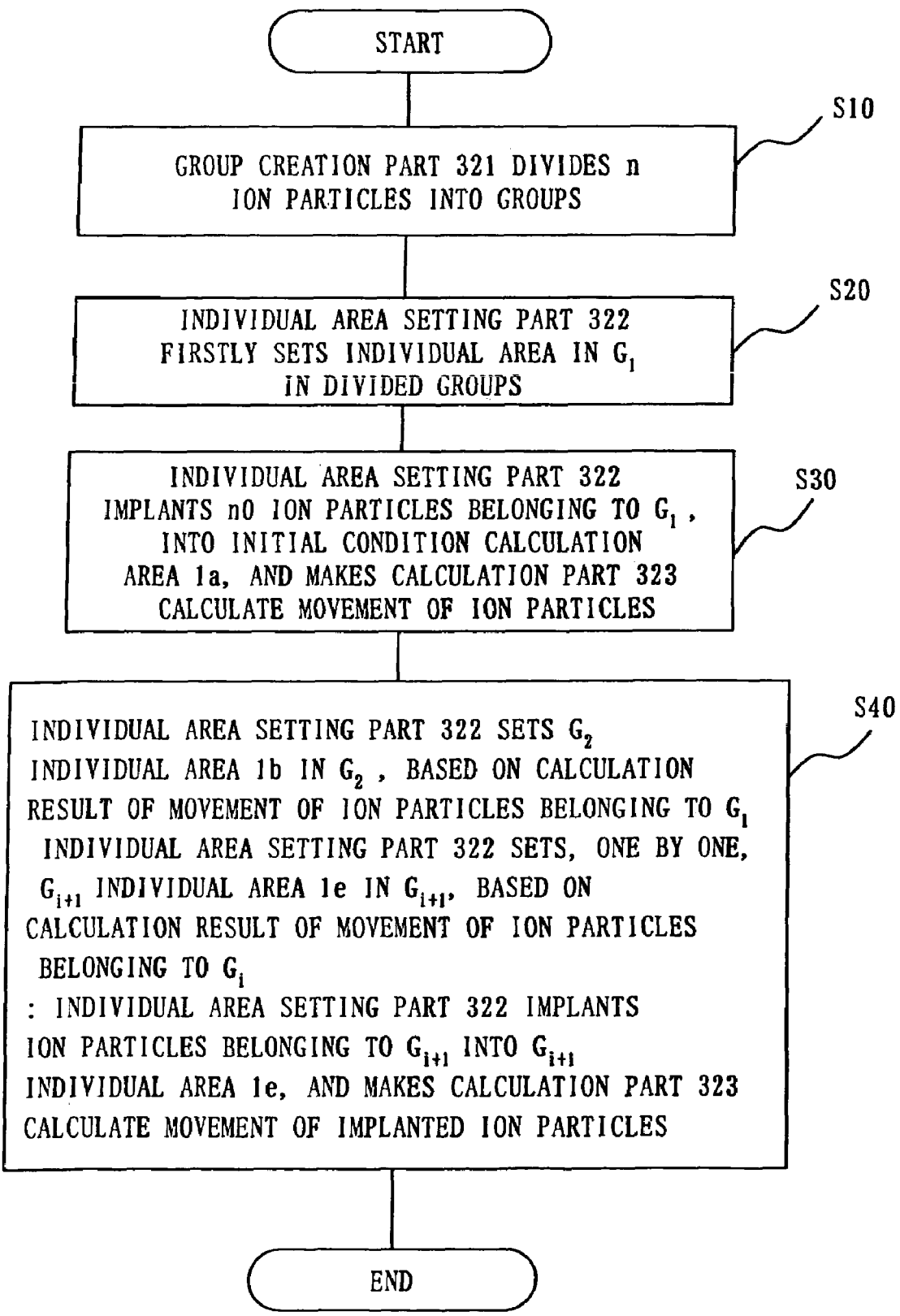
FIG. 3 is a flowchart showing the outline from dividing into groups to calculating ion implantation.

FIG. 2 illustrates the case where the group creation part 321 divides n ion particles being objects of simulation into k groups, and the individual area setting part 322 sets an individual area for each of the divided groups. FIG. 3 is a flowchart showing outlines of processes of dividing groups, setting an individual area, and performing an ion implantation calculation. With reference to FIGS. 2 and 3, outlines relating to dividing ion particles into groups and setting an individual area for each group will be explained.

In S10, the group creation part 321 divides n ion particles being objects of simulation into groups. In FIG. 2, the group creation part 321 divides n ion particles into k groups $G_1$, $G_2$, $G_3$, ..., $G_i$, $G_{i+1}$, ..., $G_k$. The storage part 50 stores particle information about n being the number of particles, k being the number of groups to be divided, and the number of ion particles belonging to each group. Each of the n particles is stored with a particle number I. In FIG. 2, particle numbers from 1 to n are given to the n particles. The group creation part 321 reads the number n of the ion particles, the number k of the groups, the number of ion particles belonging to each group, etc. from the storage part 50, and performs a group division based on these. As shown in FIG. 2, it is assumed n0 ion particles, whose particle numbers I are from 1 to n0, belong to group $G_1$.

In S20, the individual area setting part 322 sets an individual area for each of the divided groups. First, the individual area setting part 322 sets an individual area for the group $G_1$. The storage part 50 stores an initial condition calculation area $1a$ being a calculation area, as an initial condition. Concerning the group $G_1$, the individual area setting part 322 reads the initial condition calculation area $1a$ stored by the storage part 50, as an initial condition, and sets it as an individual area of the group $G_1$.

In S30, the individual area setting part 322 implants the n0 particles belonging to the group $G_1$ into the initial condition calculation area 1a, and makes the calculation part 323 calculate movement of the implanted ion particles.

In S40, the individual area setting part 322 sets a $G_2$ individual area 1b, being an individual area of a group $G_2$, based on a calculation result of movement of the n0 ion particles of the group $G_1$. Then, the individual area setting part 322 implants ion particles belonging to the group $G_2$ into the $G_2$ individual area 1b, and makes the calculation part 323 calculate movement of the ion particles. The individual area setting part 322, one by one, sets a $G_{i+1}$ individual area 1e of a group $G_{i+1}$, based on a calculation result of movement of ion particles belonging to a Group Gi ($2 \leq i \leq k-1$), implants ion particles belonging to the group $G_{i+1}$ into the $G_{i+1}$ individual area 1e, and makes the calculation part 323 calculate movement of the implanted ion particles. This operation is performed up to Group $G_k$.

Next, with reference to FIGS. 6, 7 and 8, the case that the individual area setting part 322 sets the $G_2$ individual area 1b, based on the calculation result of movement of the ion particles belonging to the group $G_1$ will now be explained in detail.

When executing an ion implantation simulation, at the time of a calculation start, the initial condition calculation area 1a for performing a calculation can be specified by a user in advance. For example, the user inputs the initial condition calculation area 1a beforehand through a keyboard, being an example of the input part 20. The storage part 50 stores the inputted initial condition calculation area 1a. The individual area setting part 322 reads the initial condition calculation area 1a from the storage part 50, and sets the initial condition calculation area 1a as an individual area of the group $G_1$ as stated above.

Figure 4:
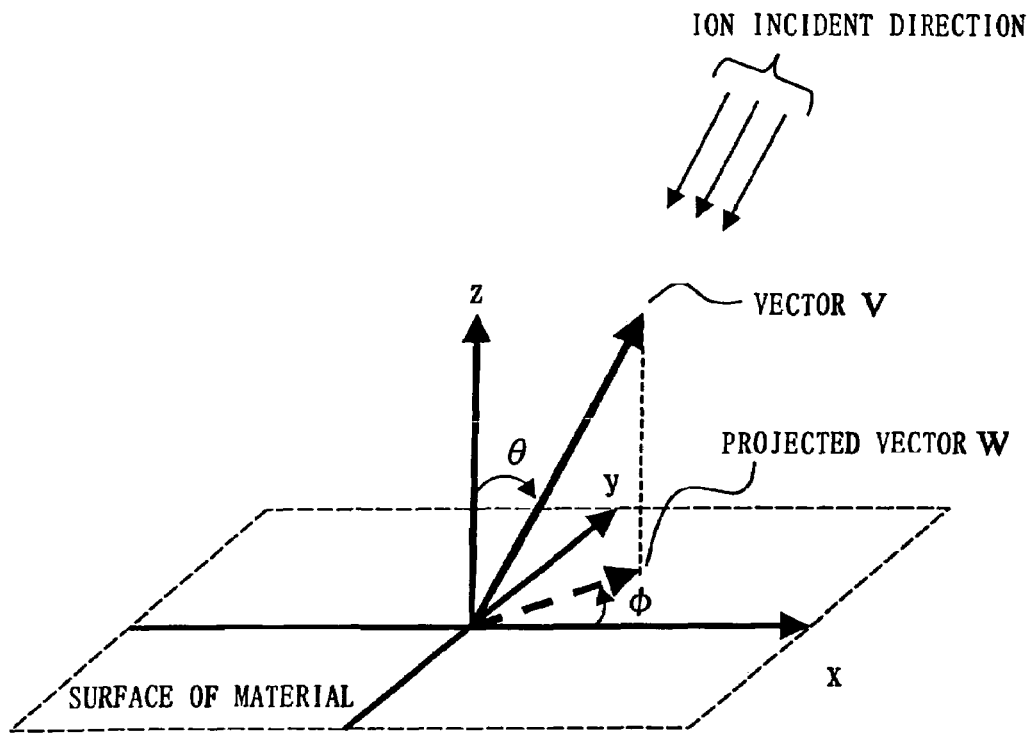
FIG. 4 shows a specifying method of an ion implantation angle in three dimensions.
Figure 5:
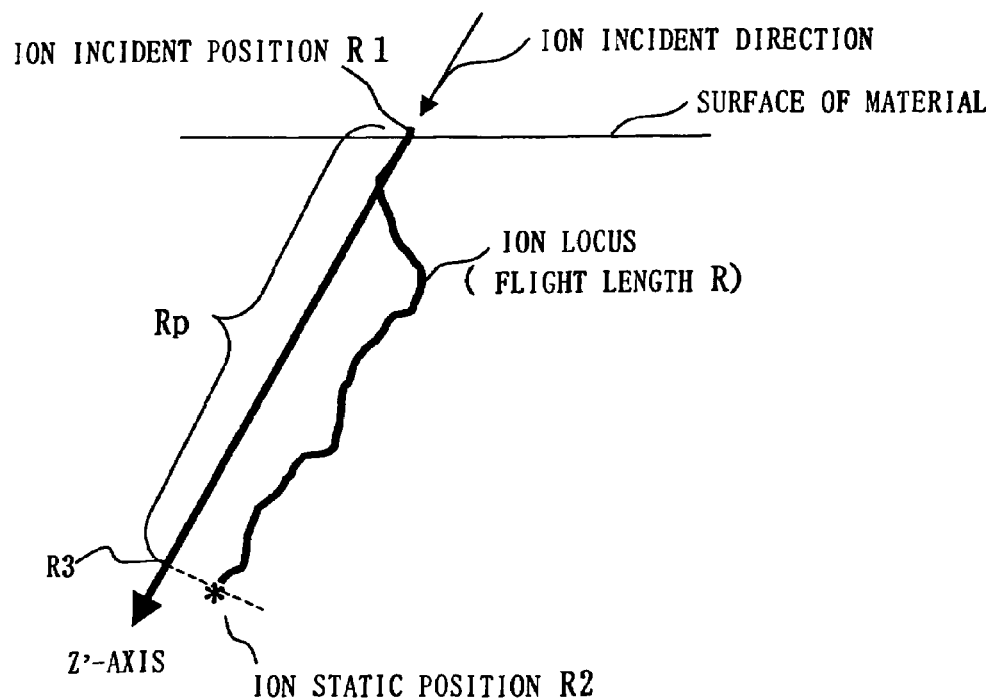
FIG. 5 illustrates a "range"

In the present Embodiment 1, for making it simple, the two dimensional section of a semiconductor device is treated as the object of the simulation. However, it is not limited to the two dimension, and the three dimensional structure or the one dimensional structure can also be treated as the same as the two dimension. With reference to FIGS. 4 and 5, a specifying method of an ion implantation angle at the three dimensional ion implantation and "range Rp" will be stated.

(1) Re: Specifying an Implantation Angle

With reference to FIG. 4, specifying an implantation angle in the three dimension will be explained. As shown in FIG. 4, x-axis, y-axis, and z-axis being upwards perpendicular are set on the material surface. Then, a vector V opposite to the incident direction of ion shown in FIG. 4 is set to be started from the origin. In the ion implantation in the three dimension, the angle θ between the z-axis and the vector V is a tilt angle. An angle φ between a projected vector W being a projection of the vector V projected onto the xy plane and the x-axis is a rotation angle. In the three dimensional ion implantation, an incident angle of ion is specified according to the tilt angle θ and the rotation angle φ.

(2) Re: "Range Rp"

With reference to FIG. 5, the "range Rp" will be briefly explained. The direction of incidence of ion is assumed to be the Z' axis direction. With respect to a typical static position (static position R2 is shown by *), ion flies along the ion locus shown in FIG. 5. In this case, the "range" generally indicates a depth measured from a surface incident position R1 of ion in the Z' axis direction. That is, the "range" is a distance between the surface incident position R1 and an R3 being a projection coordinate of the ion static position R2 towards the Z' axis. Under the same implantation conditions, since there are variations of ion positions, the range Rp of each ion can be different. Concerning this, statistics calculation can be performed to obtain a standard deviation, etc. The standard deviation in the direction of the Z' axis is generally called a dispersion dRp. Similarly, a dispersion σL (a standard deviation in a statistics calculation) perpendicular to the Z' axis can also be calculated, and it is called "a spread in the transverse direction" or "transverse direction dispersion."

Figure 6:
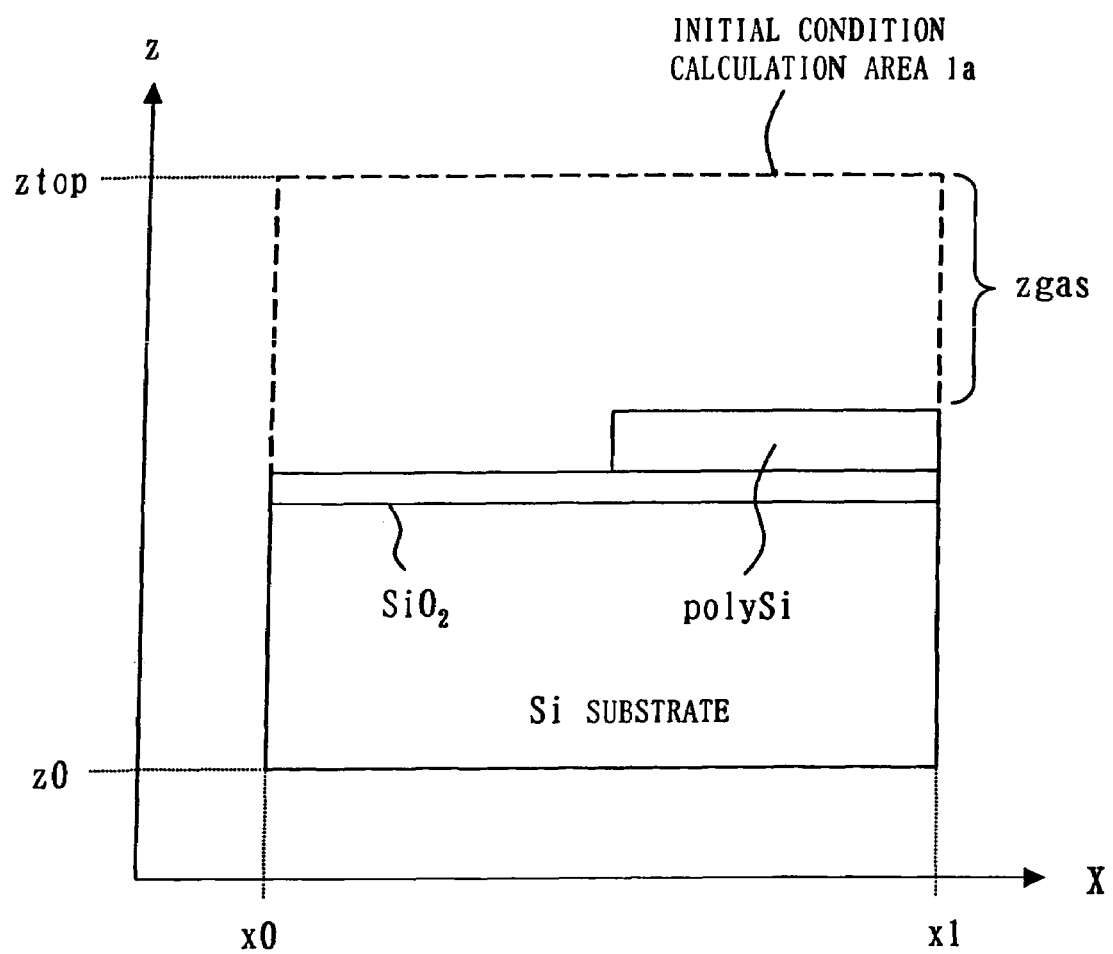
FIG. 6 shows an initial condition calculation area $1a$.

FIG. 6 shows the initial condition calculation area 1a into which the ion particles belonging to the group $G_1$ are implanted. FIG. 6 illustrates a two dimensional section of a semiconductor device. The coordinates is composed of the x-axis in the horizontal direction and the z-axis in the upward perpendicular direction. As the initial condition calculation area 1a into which the ion particles belonging to the group $G_1$ are implanted, the calculation area shown in FIG. 6 has already been made before the ion implantation calculation. As shown in the figure, in the initial condition calculation area 1a, the range of the x-axis is $x0 \leq x \leq x1$ and the range of the z-axis is $z0 \leq z \leq z\text{top}$. That is, the initial condition calculation area 1a is a rectangular area defined by $x0 \leq x \leq x1$ and $z0 \leq z \leq z\text{top}$. In addition, there are polySi (poly silicone), $SiO_2$, and Si substrate that appear in the two dimensional section of the semiconductor device.

Figure 7:
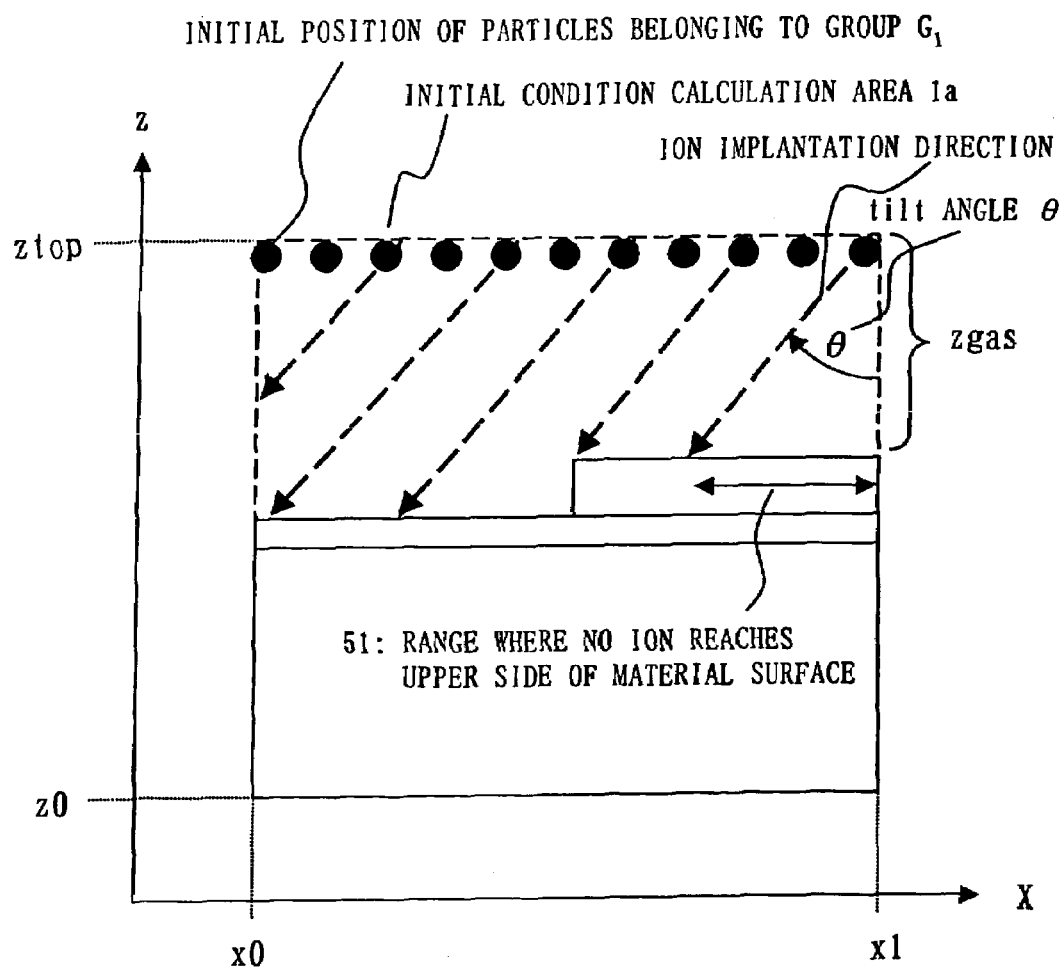
FIG. 7 shows slantingly implanting ion particles into the initial condition calculation area $1a$.

FIG. 7 shows the state in which the ion particles belonging to the group $G_1$ are slantingly implanted into the initial condition calculation area 1a. The individual area setting part 322 downwards (from the positive direction of the z-axis) implants the ion particles belonging to the group $G_1$, with a specified energy, angle, and amount of dose, into the initial condition calculation area 1a. When the individual area setting part 322 implants ion particles, the z-coordinate of the ion particle is a position away from the material top surface by a suitable height, such as a z=ztop of the upper end of the initial condition calculation area 1a, and an initial position of the x-axis is selected randomly and uniformly from the inside of the initial condition calculation area 1a ($x0 \leq x \leq x1$). Then, the individual area setting part 322 implants the ion particles at the specified energy and angle.

In this case, for example, when the tilt angle θ (an example of an implantation angle) is supposed to be 45 degrees, that is "45-degree slanting ion implantation", if the range of the x-coordinate chosen at random is assumed to be $x0 \leq x \leq x1$ of the initial condition calculation area 1a, "the range 51 where no ion reaches upper side of the material surface" as shown in the figure will be made. The individual area setting part 322 implants the ion particles belonging to the group $G_1$ into the initial condition calculation area 1a which is still in the state of "the range 51 where no ion reaches upper side of the material surface", and makes the calculation part 323 calculate movement of the ion particles. The individual area setting part 322 makes the calculation part 323 calculate a statistics amount of a range Rp ($G_1$), a standard deviation σL ($G_1$), etc. concerning the ion particles belonging to the group $G_1$.

Next, the individual area setting part 322 individually sets the $G_2$ individual area 1b as a calculation area of ion particles belonging to the group $G_2$, for the ion particles belonging to the group $G_2$. That is, in order to avoid making "the range 51 where no ion reaches upper side of the material surface" concerning the group $G_2$, as shown below, the individual area setting part 322 extends the initial condition calculation area 1a, and sets the $G_2$ individual area 1b for the group $G_2$. The setting of the $G_2$ individual area 1b will be explained.

Figure 8:
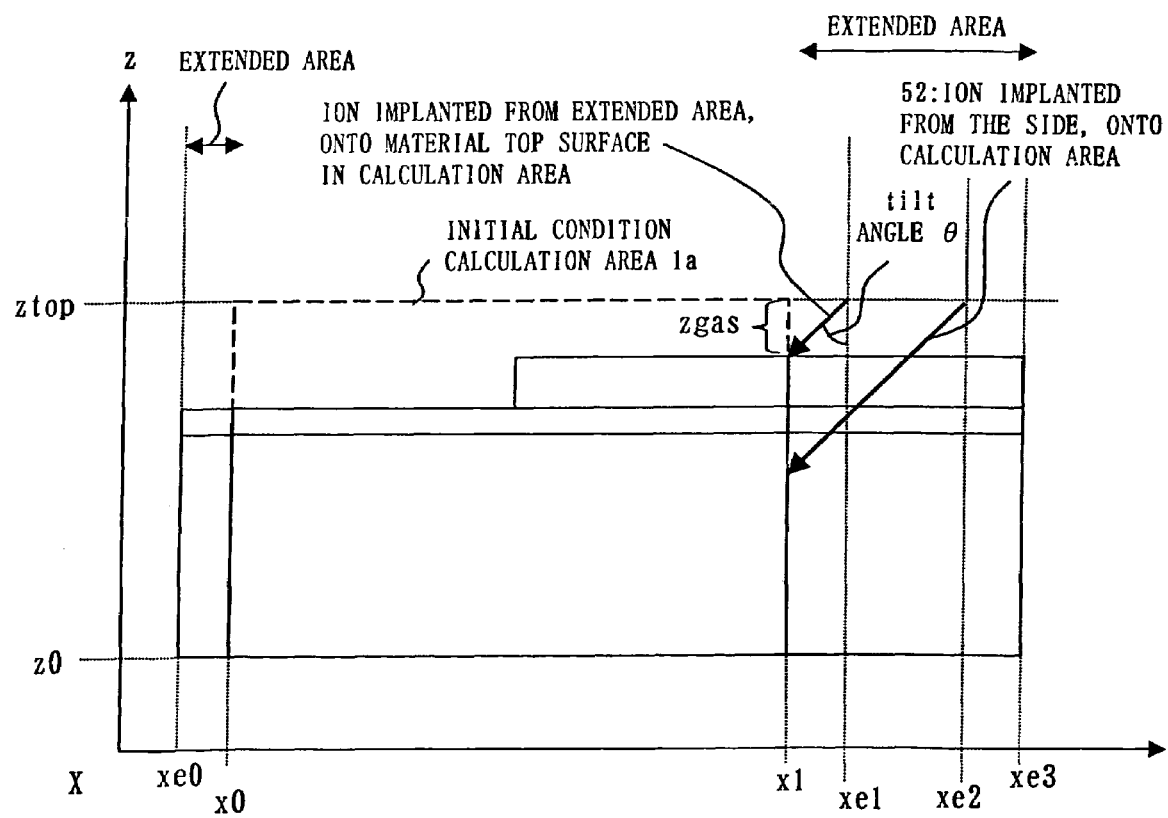
FIG. 8 shows a setup of a G2 individual area $1b$.

FIG. 8 shows the setting of the $G_2$ individual area 1b. First, the individual area setting part 322 extends the range of the x-coordinate to xe1, namely to be $x0 \leq x \leq xe1$. That is, the range of the x-coordinate chosen at random is extended to $x0 \leq x \leq xe1$, as shown in FIG. 8. When the tilt angle is supposed to be θ (not limited to 45 degrees) and the space between the material top surface and the calculation area edge (ztop) is supposed to be zgas, $$\Delta xe1 = xe1 - x1 = zgas \cdot \tan\theta \quad \text{(formula 1)}$$

where it is supposed to be $0° \leq \theta \leq 90°$

Next, the individual area setting part 322 extends the range of the x-coordinate to xe2, namely to be $x0 \leq x \leq xe2$. That is, in FIG. 8, it is impossible to supply "ion 52 implanted into a calculation area from the side" only by extending to $\Delta xe1$. Therefore, the individual area setting part 322 further extends the range of the x-coordinate to xe2, namely to be $x0 \leq x \leq xe2$ by the following (formula 2).

$$\Delta xe2 = xe2 - xe1 = Rp(G_1) \cdot \cos\theta \quad \text{(formula 2)}$$

where Rp ($G_1$) indicates a range Rp concerning the ion particles belonging to the group $G_1$ as mentioned above.

Furthermore, the individual area setting part 322 extends the range of the x-coordinate to be $xe0 \leq x \leq xe3$. After having been implanted into the inside of the material, as the ion receives scatter, it does not necessarily go straight. It is thought that the ion scatters with the standard deviation σL in the direction perpendicular to the advancing direction. For this reason, the standard deviation σL ($G_1$) of the statistics amount obtained by the calculation concerning the ion particles belonging to the group $G_1$ is taken into consideration. Using the standard deviation σL, the individual area setting part 322 further extends the area to $xe0 \leq x \leq xe3$. $\Delta xe3$ and $\Delta xe0$ indicating extension widths can be calculated from the following (formula 3) and (formula 4).

$$\Delta xe3 = xe3 - xe2 = k \cdot \sigma L(G_1) \quad \text{(formula 3)}$$

$$\Delta xe0 = x0 - xe0 = k \cdot \sigma L(G_1) \quad \text{(formula 4)}$$

where k is supposed to be a suitable coefficient. Therefore, the individual area setting part 322 sets a rectangular area specified by $xe0 \leq x \leq xe3$ and $z0 \leq z \leq ztop$ as the $G_2$ individual area 1b.

In the above calculation, relating to n0 ion particles belonging to the group $G_1$, the individual area setting part 322 makes the calculation part 323 calculate relating to them in the initial condition calculation area 1a in which an extended area is not taken into consideration. As a calculation result of movement of the ion particles belonging to the group $G_1$ and implanted into the initial condition calculation area 1a, the range Rp ($G_1$) and the standard deviation σL ($G_1$) indicating an amount of statistics are calculated. Using the range Rp ($G_1$) and the standard deviation σL ($G_1$), the individual area setting part 322 calculates $\Delta xe2$, $\Delta xe3$, and $\Delta xe0$, and sets the $G_2$ individual area 1b. In this way, the individual area of the group $G_2$ has been set. The individual area setting part 322 implants the ion particles belonging to the group $G_2$ into the $G_2$ individual area 1b, and makes the calculation part 323 calculate movement of these ion particles.

As explained in the Related Art, since an amorphous phenomenon of a silicone crystal arises in proportion as the ion implantation progresses, if the calculation area ($G_2$ individual area 1b) obtained from the range Rp ($G_1$) and the standard deviation σL ($G_1$) is continuously used as it is, the calculation accuracy will fall. For example, when a silicone (100) substrate is used, in the slanting ion implantation of 45 degrees, channeling in the direction of (110) becomes remarkable.

Consequently, with respect to the range Rp ($G_1$) and the standard deviation σL ($G_1$) obtained based on a calculation result of movement of the n0 ion particles in the initial condition calculation area 1a, since a silicone crystal becomes amorphous in proportion as the implantation progresses, the range Rp ($G_1$) gradually becomes small, and on the other hand, the standard deviation σL ($G_1$) gradually becomes large. For this reason, it will lack validity and cause a fall of calculation accuracy to continue applying the $G_2$ individual area 1b, based on the above obtained $\Delta xe2$, $\Delta xe3$, $\Delta xe0$, etc., as it is. Therefore, it is insufficient to set the $G_2$ individual area 1b for the group $G_2$ after the initial condition calculation area 1a. Accordingly, as shown in FIG. 2, it becomes necessary to set an individual area one by one for each of groups $G_3$, ..., $G_i$, etc.

That is, even after setting the $G_2$ individual area 1b, the individual area setting part 322, one by one, sets an individual area of group $G_{i+1}$, based on a calculation result of movement of ion particles belonging to the group $G_i$ ($2 \leq i \leq k-1$), implants ion particles belonging to the group $G_{i+1}$ into the set individual area of the group $G_{i+1}$, and makes the calculation part 323 calculate movement of the implanted ion particles. By repeating this process, it is possible to perform high-accuracy simulation taking an amorphous phenomenon of a silicone crystal into consideration.

Figure 9:
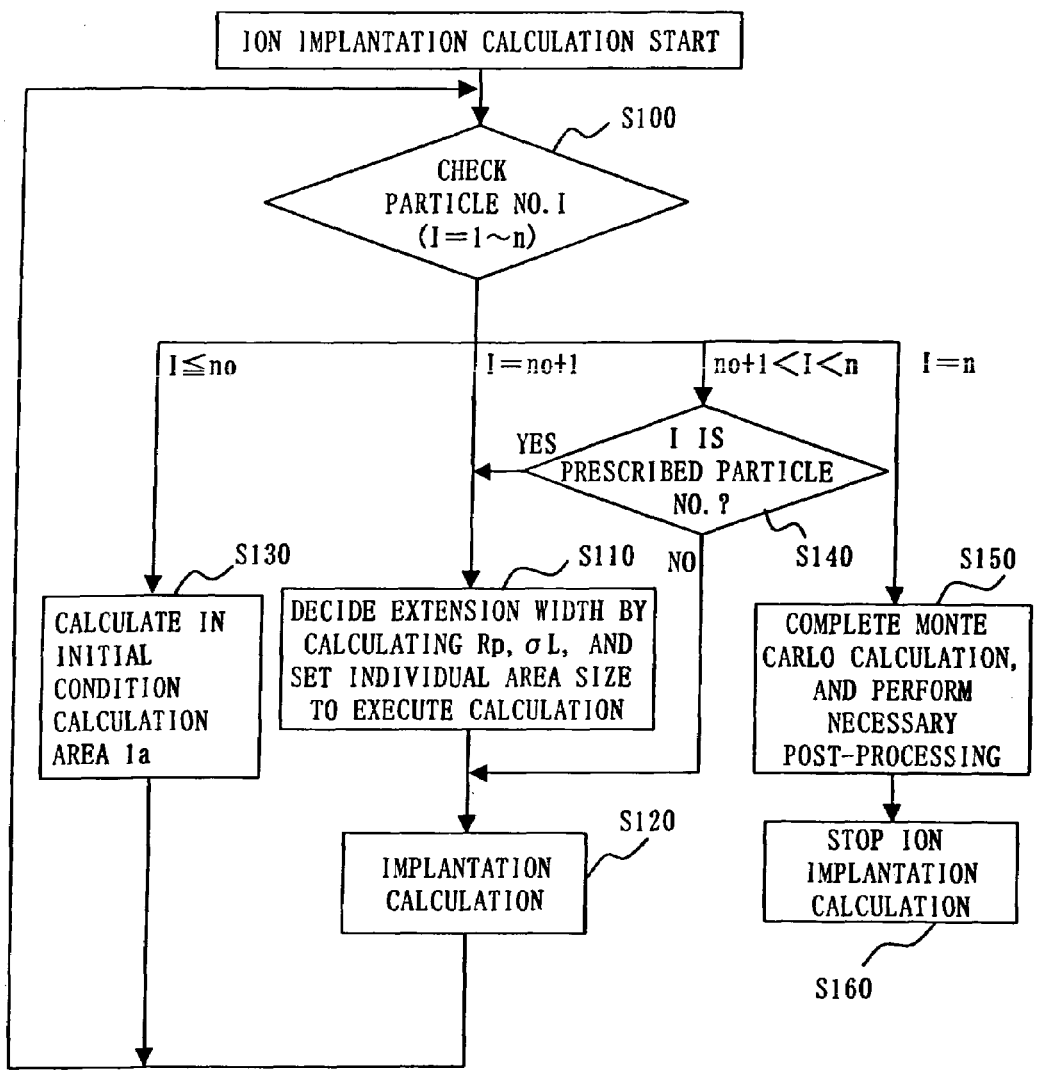
FIG. 9 is a flowchart showing processes of setting an individual area for each of groups from $G_1$ to $G_k$ and calculating with respect to all the n ion particles.

Next, with reference to FIGS. 2 and 9, operations of setting an individual area for each of all the groups from $G_1$ to $G_k$ and calculating with respect to all the n ion particles will be described. FIG. 9 is a flowchart showing processes of setting an individual area for each of all the groups from $G_1$ to $G_k$ and calculating with respect to all the n ion particles.

As shown in FIG. 2, the group creation part 321 first divides n ion particles into k groups from group $G_1$ to group $G_k$ ($k \geq 3$). The group creation part 321 divides the n ion particles into the k groups in order of particle numbers from 1 to n given to the n ion particles. The group creation part 321 creates a group regarding, for example, 1% or 10% of the total n particles, as the number of particles of each group. For example, in the case of 1%, if the total number of particles is $10^4$, they will be divided into 100 groups and the number of particles of each group will be 100. Such number of the groups and the particles of each group are stored beforehand in the storage part 50. It is also acceptable for a user to specify, as input data, the number of groups and the number of particles of each group to be created by the group creation part 321. It is supposed that the number of groups to divide is to be at least three or more so that the influence of the amorphous phenomenon may be reflected. Thus, the group creation part 321 determines the number of groups to be used for a group division and the number of particles belonging to each group, based on the total n particles.

In the present Embodiment 1, calculation with respect to n0 ion particles is performed for the group $G_1$, and with performing calculation about remaining n–n0 particles, values of the range Rp and the standard deviation σL are recalculated at suitable intervals. Then, the value of the calculation area is re-set to be a suitable value, and subsequent implantation calculation of ion particles is performed using it as an individual area.

Depending upon difference of particle numbers, processes will be the following four:

(1) The case of the particle number I being equal to or less than n0 ($I \leq n0$). That is, the case of an ion particle belonging to the group $G_1$.

(2) The case of the particle number I being equal to "n0+1" (I=n0+1). That is, the case of an ion particle being the head particle 10 of the group $G_2$.

(3) The case of the particle number I being greater than "n0+1" and less than n (n0+1<I<n). That is, the case of an ion particle being between the head particle 10 of the group $G_2$ and the last particle 19 of the group $G_k$.

(4) The case of the particle number I being n (I=n). That is, the case of an ion particle being the last particle 19.

First, the case of "I≦n0" of the above (1) is explained. In S100, the individual area setting part 322 checks the particle number I of an ion particle to implant. When the particle number I is equal to or less than n0, it goes to S130 from S100, and it will be repeated to perform this. In S130, the individual area setting part 322 implants the ion particle into the initial condition calculation area 1*a*, and makes the calculation part 323 calculate movement of the ion particle. Therefore, all of the n0 ion particles belonging to the group $G_1$ are calculated in the initial condition calculation area 1*a*.

Next, the case of "I=n0+1" of the above (2) is explained. In S100, the individual area setting part 322 checks the particle number I of an ion particle to implant. If the individual area setting part 322 checks the particle number I to be "I=n0+1" (the head particle 10 of the group $G_2$), it goes to S110. In S110, as mentioned above, Δxe2, Δxe3, and Δxe0 are calculated by using Rp ($G_1$) and σL ($G_1$), and the $G_2$ individual area 1*b* is set up. In S120, calculating the head particle 10 of the group $G_2$ shown in FIG. 2 is started using this $G_2$ individual area 1*b*.

Next, the case of "n0+1<I<n" of the above (3) is explained. In S100, the individual area setting part 322 checks the particle number I of an ion particle to implant. When the particle number I is "n0+1<I<n", it goes to S140 from S100. In S140, the individual area setting part 322 checks whether the particle number I is a prescribed particle number or not. The "prescribed particle number" herein corresponds to, for instance, the particle number of the head particle 11, the head particle 12, the head particle 13, and the head particle 14 of each of the groups from group $G_3$ to group $G_k$. In addition, the head particle 10 of the group $G_2$ is not included because it has already been processed in S110 of the above (2). When the individual area setting part 322 checks that the particle number I does not correspond to the "prescribed particle number", it goes to S120. In S120, the ion particle is calculated in the same individual calculation area as that of another ion particle whose particle number is smaller by one. Therefore, particles from the head particle 10 of the group $G_2$ to the last particle of the group $G_2$ (the particle just before the head particle 11) are implanted and calculated in the $G_2$ individual area 1*b*.

On the other hand, when the individual area setting part 322 checks the particle number I to be the "prescribed particle number", it goes to S110. That is, when the individual area setting part 322 checks that the particle number I corresponds to the particle number of the head particle 11 of the group $G_3$ shown in FIG. 2, the Δxe2, Δxe3, Δxe0, etc. are calculated by using the range Rp ($G_2$) and the standard deviation σL ($G_2$) based on the calculation result of the group $G_2$, and a $G_3$ individual area 1*c* is set. Then, as from this, when the individual area setting part 322 confirms that the particle number I corresponds to be the particle number of the head particle 13 of group $G_{i+1}$, the Δxe2, Δxe3, Δxe0, etc. are calculated by using the range Rp ($G_i$) and the standard deviation σL ($G_i$) based on a calculation result of the group $G_i$, and a $G_{i+1}$ individual area 1*e* is set.

Finally, the case of "I=n" of the above (4) is explained. In S100, when the individual area setting part 322 checks a particle number to be the particle number of the last particle 19, it goes to S150 to complete the Monte Carlo calculation, and perform necessary post-processing. Then, it goes to S160 to complete the ion implantation calculation.

In the above, the individual area of the next group is re-set by using values of the range Rp and the standard deviation σL of the group just before the next group. However, it is also acceptable that the individual area setting part 322 judges whether values of the range Rp and the standard deviation σL have changed to be different from the range Rp and the standard deviation σL of the preceding group but one group, by difference more than a rate prescribed in advance or not, and only when it is judged that the difference is more than the specified rate, a new individual area is set up. That is, though the individual area setting part 322 sets the individual area of the group $G_{i+1}$ by using the range Rp ($G_i$) and the standard deviation σL ($G_i$) calculated with respect to the particles of the group $G_i$, it is judged whether the range Rp ($G_i$) and the standard deviation σL ($G_i$) have changed to be different from the range Rp ($G_{i-1}$) and the standard deviation σL ($G_{i-1}$) of the group $G_{i-1}$ which is the preceding group but one group, by difference more than a prescribed rate, and only when it is judged that the difference is more than the prescribed rate, the individual area of the group $G_{i+1}$ is set to be an individual area different from the individual area of the group $G_i$. If the difference is not more than the prescribed rate, the individual area setting part 322 sets the individual area of the group $G_i$ as it is, as an individual area of the group $G_{i+1}$. The storage part 50 has stored the above-mentioned rate, and the individual area setting part 322 reads it.

The rate of changing of values of the range Rp, the standard deviation σL, etc. because of channeling suppression based on an amorphous phenomenon can be various depending upon the implantation conditions. When the values have not changed largely, only a check is performed, and under the conditions practically changing, a calculation area (individual area) is changed. By such system, suitable processing is automatically performed.

In the above, slanting ion implantation has been described as an example. In the case of ion vertical implantation, the standard deviation σL is also used for determining an extension width in order to maintain the accuracy of concentration distribution near a calculation area edge. The vertical ion implantation is one of indispensable implantation conditions in a small device. In the implantation conditions of comparatively high amount of dose, impurities concentration is inaccurate at the calculation area edge in the conventional method. According to the present Embodiment, it is possible to set an individual area by detecting a change of a value of the standard deviation σL and setting a suitable extended area. Therefore, a calculation result can be highly accurate.

The semiconductor device design simulation apparatus 100 of Embodiment 1 includes the group creation part 321 which divides ion particles into groups according to particle numbers, the individual area setting part 322 which sets an individual area, as a calculation area, for each of groups divided by the group creation part 321 and implants ion particles into the individual area, and the calculation part 323 which calculates the implanted ion particles. Therefore, since a calculation area is set for each group to calculate, it is possible to simulate with high accuracy.

According to the semiconductor device design simulation apparatus 100 of Embodiment 1, the individual area setting part 322 sets, one by one, an individual area of the group $G_{i+1}$ based on a calculation result of movement of the ion particle belonging to the group $G_i$, implants ion particles belonging to the group $G_{i+1}$ into the set individual area of the group $G_{i+1}$, and makes the calculation part 323 calculate movement of the implanted ion particles. Therefore, since calculation is performed by setting a calculation area of the next group based on a calculation result of the group just before, simulation calculation of high accuracy can be performed.

According to the semiconductor device design simulation apparatus 100 of Embodiment 1, in the case of setting an individual area of the group $G_j$, the individual area setting part 322 sets an individual area by using an implantation angle of an ion particle at the time of ion particles belonging to the group $G_{j-1}$ being implanted into the individual area of the group $G_{j-1}$, a range of the ion particle in the incident direction, and a standard deviation of a stopping position perpendicular to the incident direction of the ion particle. Therefore, it is possible to perform high-accuracy simulation reflecting an amorphous phenomenon.

According to the semiconductor device design simulation apparatus 100 of Embodiment 1, in the case of setting an individual area of the group $G_j$, the individual area setting part 322 judges whether to set the individual area of the group $G_{j-1}$ as the individual area of the group $G_j$, based on a calculation result of movement of the ion particle belonging to $G_{j-1}$. If it is judged to set, the individual area setting part 322 sets the individual area of the group $G_{j-1}$ as the individual area of the group $G_j$. If it is judged not to set, the individual area setting part 322 sets an individual area different from the individual area of the group $G_{j-1}$, as the individual area of the group $G_j$. Therefore, it is possible to perform calculation efficiently.

According to the semiconductor device design simulation apparatus 100 of Embodiment 1, the group creation part 321 determines the number of groups to be divided, based on n indicating the number of ion particles. Therefore, the efficiency of calculation can be progressed and the calculation accuracy can be enhanced.

As mentioned above, according to Embodiment 1, in the ion implantation simulation using the Monte Carlo method, only by setting the initial condition calculation area 1a requiring a profile, an initial position of incident ion and an area where movement of the incident ion is tracked are automatically and suitably calculated and set inside the apparatus, and since the effect of a silicone substrate changing in proportion to the implantation is also taken into consideration, ion implantation calculation can be efficiently performed without futility. Therefore, there is an effect that a high-accuracy result can be obtained in a short time compared to the conventional means.

As mentioned above, according to Embodiment 1, the size of an individual area is dynamically calculated depending upon an amorphous phenomenon to be used for subsequent implantation calculation. Even in the case of ion implantation under the implantation conditions of remarkable channeling, and even when channeling does not happen easily as the dose amount becomes high, since it is possible to set a suitable extended area around the initial condition calculation area 1a, a more accurate result can be obtained in the simulation compared to the that of the same number particles.

As mentioned above, according to the semiconductor device design simulation apparatus 100 of Embodiment 1, a setting range of an initial position of a particle used for the next calculation and a range of an area where the particle is tracked are calculated based on a calculation result obtained by using n0 particles, in the n particles of the total number used for calculation. Then, at prescribed intervals, the calculation result is reviewed, and if necessary, the setting range of the initial position of particles and the range of area where the particles are tracked used for the next calculation are re-set to calculate subsequent calculation.

As mentioned above, according to the semiconductor device design simulation apparatus 100 of Embodiment 1, in order to calculate a setting range of an initial position of a particle and a range of an area where the particle is tracked, a range Rp in the incident direction and a standard deviation σL at a stopping position in the direction perpendicular to the incident direction of the particle which have been calculated are used in addition to an angle of implantation conditions.

Embodiment 2

Figure 10:
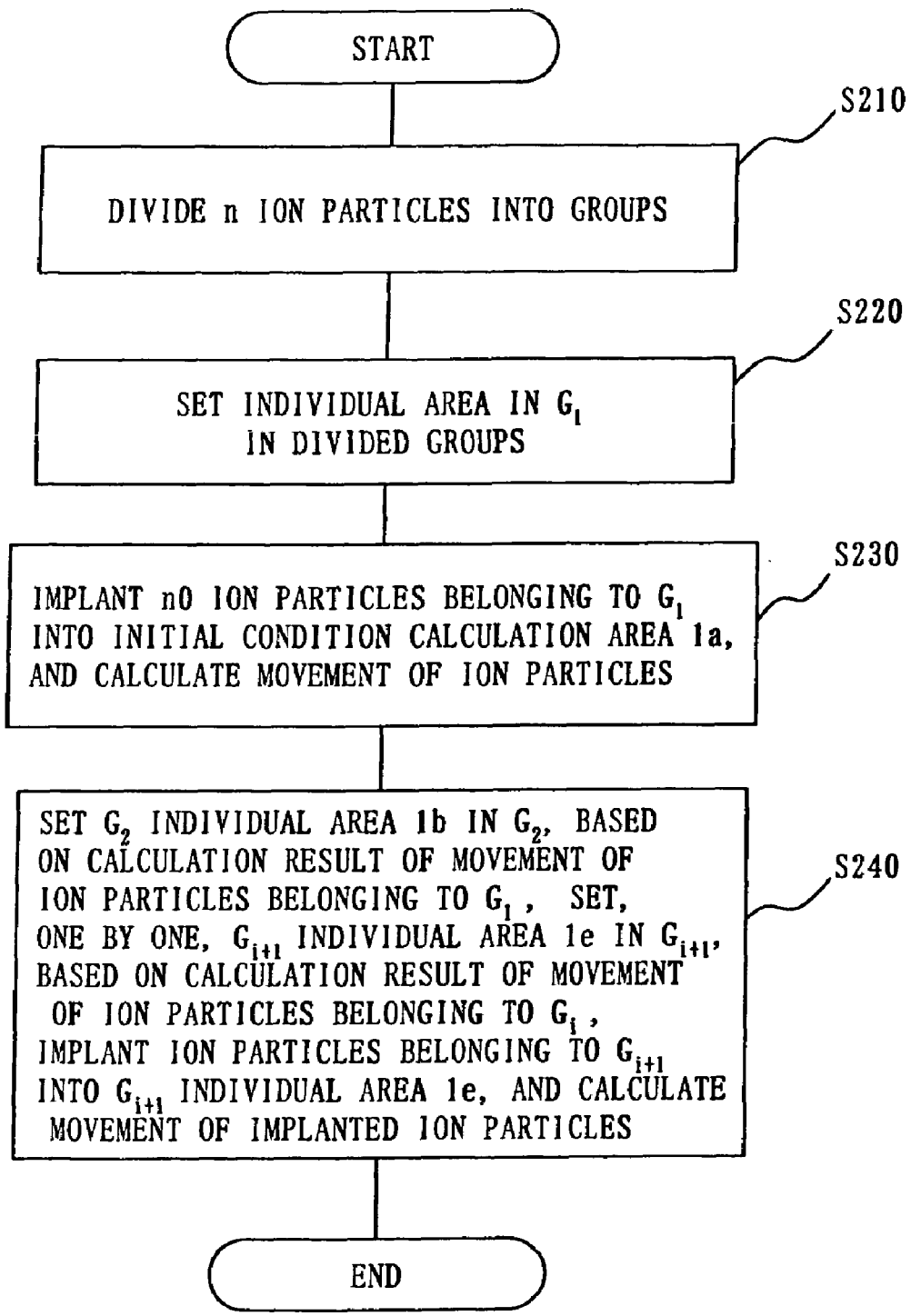
FIG. 10 is a flowchart showing the outline from dividing into groups to calculating ion implantation.
Figure 11:
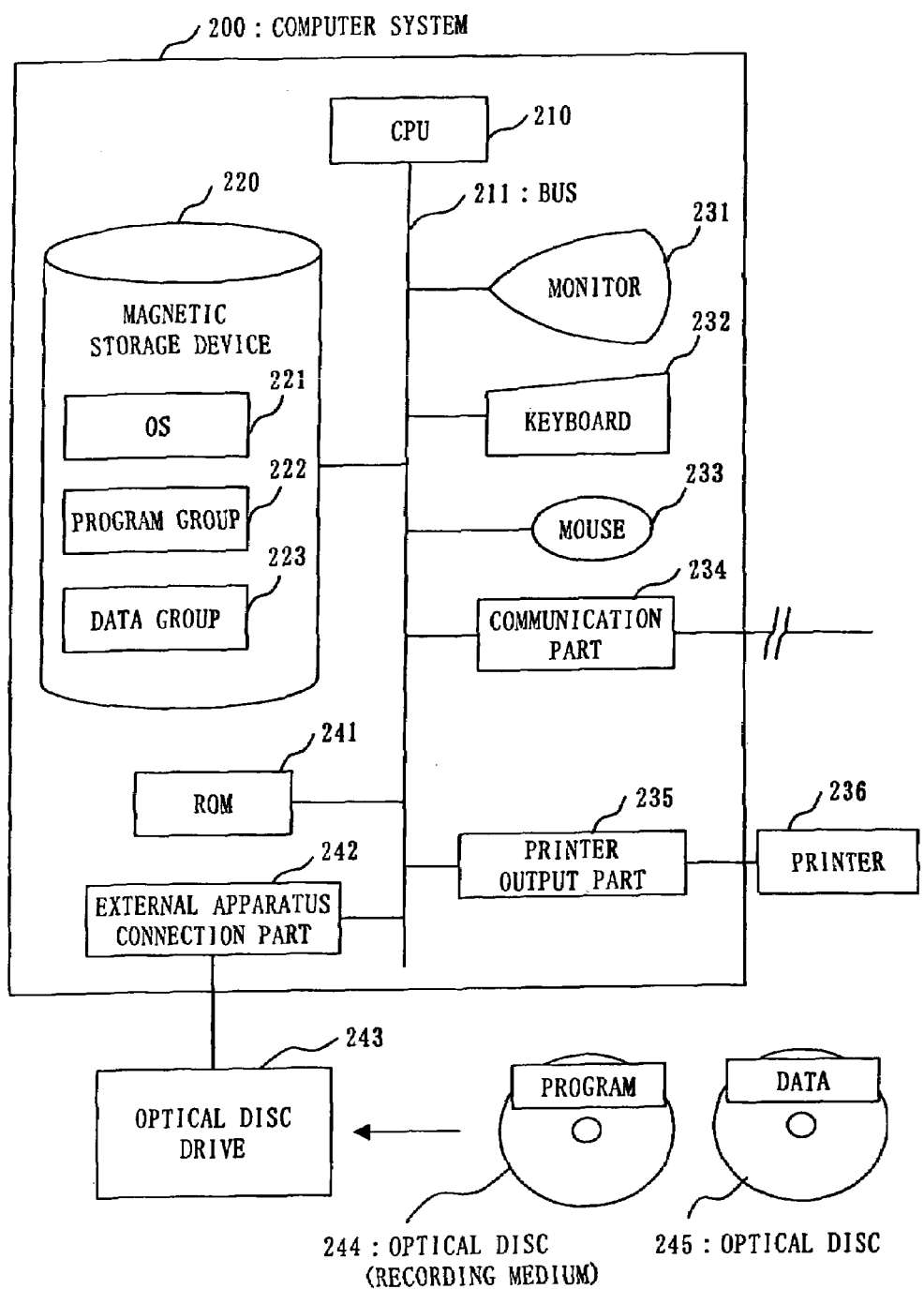
FIG. 11 shows a structure of a computer system 200 according to Embodiment 2.

With reference to FIGS. 10 and 11, Embodiment 2 will be explained. Embodiment 2 is an embodiment where operations of the ion implantation simulation calculation of the semiconductor device design simulation apparatus 100 according to Embodiment 1 are executed by a method, a program, and a recording medium storing the program.

Since the operation of each structure element of the semiconductor device design simulation apparatus 100 is mutually related in Embodiment 1, it is possible to replace the operation as a series of operations, taking the relation of the operation into consideration. Thus, by replacing the operation of each structure element with a series of operations, an embodiment of a method can be structured.

FIG. 10 is a flowchart showing an embodiment of a method structured by replacing the operations of the group creation part 321, the individual area setting part 322, and the calculation part 323 of the semiconductor device design simulation apparatus 100 according to Embodiment 1 with a series of operations. FIG. 10 corresponds to the flowchart of FIG. 3.

In S210, n ion particles being simulation objects are divided into groups. Similar to the case of FIG. 2, n ion particles are divided into k groups $G_1$, $G_2$, $G_3$, . . . , $G_i$, $G_{i+1}$, . . . , $G_k$.

In S220, an individual area is set for a group in the divided groups. First, the initial condition calculation area 1a is set for the group $G_1$ as an individual area of the group $G_1$.

In S230, the n0 particles belonging to the group $G_1$ are implanted into the initial condition calculation area 1a to calculate movement of the ion particle.

In S240, the following operation is performed. The $G_2$ individual area 1b is set for the group $G_2$, based on a calculation result of movement of the n0 ion particles of the group $G_1$. Then, ion particles belonging to the group $G_2$ are implanted into the $G_2$ individual area 1b to calculate movement of the ion particles. The $G_{i+1}$ individual area 1e of the group $G_{i+1}$ is set one by one, based on a calculation result of movement of ion particles belonging to the group $G_i$ ($2 \leq i \leq k-1$). Ion particles belonging to the group $G_{i+1}$ are implanted into the $G_{i+1}$ individual area 1e to calculate movement of the implanted ion particles. This operation is performed up to Group $G_k$. Thus, a series of the operations of the group creation part 321, the individual area setting part 322, and the calculation part 323 can be grasped as an embodiment of a method.

Moreover, by replacing a series of operations of each structure element stated above with processing of each structure element, an embodiment of a program can be structured. That is, by replacing a series of operations from S210 to S240 with processing, an embodiment of a program can be structured. Moreover, by recording a program in a computer-readable recording medium, an embodiment of a computer-readable recording medium in which the program is recorded can be structured.

It is possible to structure the embodiment of the program and the embodiment of the computer-readable recording medium in which the program is recorded by a program all of which can be operated by a computer.

FIG. 11 shows a structure of a computer system 200 according to Embodiment 2 which, by a program, executes the operation concerning the ion implantation simulation calculation of the semiconductor device design simulation apparatus 100 according to Embodiment 1. A magnetic storage device 220, a monitor 231, a keyboard 232, a mouse 233, a communication part 234, a printer output part 235, a ROM 241, an external apparatus connection part 242, etc. are connected to a CPU 210 through a bus 211. An OS 221 being an operating system, a program group 222, and a data group 223 are stored in the magnetic storage device 220. A printer 236 is connected to the printer output part 235. The communication part 234 is connected to a network (not shown).

The program group 222 is executed by the CPU 210 and the OS 221. An optical disc drive 243 is connected to the external apparatus connection part 242. An optical disc 244 (an example of a computer-readable recording medium in which a program is recorded), in which an ion implantation simulation program is recorded, or an optical disc 245 for data, in which data required for an ion implantation simulation program is recorded, can be set to the optical disc drive 243 and can be stored in the magnetic storage device 220. The ion implantation simulation program can also be stored in the program group 222 by the communication part 234 via a network.

Now, the corresponding relation between the semiconductor device design simulation apparatus 100 of FIG. 1 and the computer system 200 of FIG. 11 will be explained.

The input part 20 of the semiconductor device design simulation apparatus 100 corresponds to the keyboard 232, the mouse 233, the optical disc drive 243, and the communication part 234 etc. of the computer system 200.

The operation of the ion implantation process calculation part 32 of the semiconductor device design simulation apparatus 100 is executed by the ion implantation simulation program. The ion implantation simulation program is stored in the program group 222 of the magnetic storage device 220 of the computer system 200. This ion implantation simulation program is read from the optical disc 244, read from the communication part 234 through a network, stored in the magnetic storage device 220 beforehand, or stored in the ROM 241 beforehand.

The output part 40 of the semiconductor device design simulation apparatus 100 corresponds to the monitor 231, the printer output part 235, the printer 236, etc.

The storage part 50 of the semiconductor device design simulation apparatus 100 corresponds to the magnetic storage device 220 and the ROM 241.

Each processing in the embodiment of the program and in the embodiment of the computer-readable recording medium in which the program is recorded is executed by a program. As mentioned above, this program is recorded in the magnetic storage device 220, and read into the CPU 210 from the magnetic storage device 220. Each processing of the ion implantation simulation program is executed by the CPU 210.

Moreover, software or a program can be executed by firmware stored in the ROM 241. It is also acceptable to realize the ion implantation simulation program by a combination of software, firmware, and hardware.

In the computer system 200 according to Embodiment 2, simulation of concentration distribution at the ion implantation is performed by the ion implantation simulation program. Therefore, it is possible to perform the ion implantation simulation by using a general-purpose computer system, without needing a special apparatus.

Since the computer-readable recording medium according to Embodiment 2 records an ion implantation simulation program, other computer systems can easily include the ion implantation simulation program. In addition, keeping and management of the ion implantation simulation program can be easily performed.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

What is claimed is:

1. An ion implantation simulation apparatus for simulating movement of an ion particle to which a particle number is given, comprising:
    a group creation part to divide n ion particles (n≧3) into groups of at least three, according to the particle number;
    an individual area setting part to individually set up a calculation area, as an individual area, indicating an area for calculating movement of one of the n ion particles for each of the groups divided by the group creation part, and to implant the one of the n ion particles into the individual area individually set up for performing simulation;
    a calculation part to calculate the movement of the one of the n ion particles implanted by the individual area setting part to simulate movement of the one of the n ion particles; and
    an output device configured to output a result of the simulated movement of the one of the n ion particles.

2. The ion implantation simulation apparatus of claim 1 further comprising:
    a storage part to store a calculation area defined based on an initial condition, as an initial condition calculation area,
    wherein the group creation part divides the n ion particles into k (k≧3) groups of a group $G_1$, a group $G_2$, ..., and a group $G_k$ in order of the particle number, and
    the individual area setting part sets the initial condition calculation area stored by the storage part, as an individual area of the group $G_1$, implants an ion particle belonging to the group $G_1$ into the individual area of the group $G_1$, and makes the calculation part calculate movement of an implanted ion particle,
    based on a calculation result of the movement of the implanted ion particle belonging to the group $G_1$, sets an individual area of the group $G_2$, implants an ion particle belonging to the group $G_2$ into the individual area of the group $G_2$, and makes the calculation part calculate movement of an implanted ion particle, and
    one by one, based on a calculation result of movement of an ion particle belonging to a group $G_i$ (2≦i≦k−1), sets an individual area of a group $G_{i+1}$, implants an ion particle belonging to the group $G_{i+1}$ into the individual area of the group $G_{i+1}$ and makes the calculation part calculate movement of an implanted ion particle.

3. The ion implantation simulation apparatus of claim 1, wherein the group creation part determines a number of groups to be divided, based on n indicating a number of ion particles.

4. The ion implantation simulation apparatus of claim 2, wherein the individual area setting part, in a case of setting an individual area of a group $G_j$ (2≦j≦k), sets the individual area by using an implantation angle of an ion particle, a range in an incident direction of the ion particle, and a standard deviation of a stopping position perpendicular to the incident direction of the ion particle which are concerning implantation of the ion particle belonging to a group $G_{j-1}$ into an individual area of the group $G_{j-1}$.

5. The ion implantation simulation apparatus of claim 2, wherein the individual area setting part, in a case of setting an individual area of a group $G_j$ (2≦j≦k), based on a calculation result of movement of an ion particle belonging to a group $G_{j-1}$, judges whether to set an individual area of the group $G_{j-1}$ as the individual area of the group $G_j$, if it is judged to set, sets the individual area of the group $G_{j-1}$ as the individual area of the group $G_j$, and if it is judged not to set, sets an individual area different from the individual area of the group $G_{j-1}$ as the individual area of the group $G_j$.

6. The ion implantation simulation apparatus of claim 2, wherein the group creation part determines a number of groups to be divided, based on n indicating a number of ion particles.

7. The ion implantation simulation apparatus of claim 4, wherein the individual area setting part, in a case of setting an individual area of a group $G_j$ ($2 \leqq j \leqq k$), based on a calculation result of movement of an ion particle belonging to a group $G_{j-1}$, judges whether to set an individual area of the group $G_{j-1}$ as the individual area of the group $G_j$, if it is judged to set, sets the individual area of the group $G_{j-1}$ as the individual area of the group $G_j$, and if it is judged not to set, sets an individual area different from the individual area of the group $G_{j-1}$, as the individual area of the group $G_j$.

8. The ion implantation simulation apparatus of claim 4, wherein the group creation part determines a number of groups to be divided, based on n indicating a number of ion particles.

9. The ion implantation simulation apparatus of claim 5, wherein the group creation part determines a number of groups to be divided, based on n indicating a number of ion particles.

10. An ion implantation simulation method for simulating movement of an ion particle to which a particle number is given, comprising:

dividing n ion particles ($n \geqq 3$) into groups of at least three, according to the particle number;

individually setting up a calculation area, as an individual area, indicating an area for calculating movement of one of the n ion particles, for each of divided groups, and implanting the one of the n ion particles into the individual area individually set up, for performing simulation;

calculating the movement of implanted one of the n ion particles to simulate movement of the one of the n ion particles; and outputting a result of the simulated movement of the one of the n ion particles.

11. A computer readable storage medium including computer program instructions, which when executed by a computer, cause the computer to perform a method of simulating movement of an ion particle to which a particle number is given, the method comprising:

dividing n ion particles ($n \geqq 3$) into groups of at least three, according to the particle number;

individually setting up a calculation area, as an individual area, indicating an area for calculating movement of one of the n ion particles, for each of divided groups, and implanting the one of the n ion particles into the individual area individually set up, for performing simulation;

calculating the movement of implanted one of the n ion particles to simulate movement of the one of the n ion particles; and outputting a result of the simulated movement of the one of the n ion particles.

* * * * *